United States Patent
Yasunori (10) Patent No.: US 11,784,871 B2
(45) Date of Patent: Oct. 10, 2023

(54) RELAY APPARATUS AND SYSTEM FOR DETECTING ABNORMALITIES DUE TO AN UNAUTHORIZED WIRELESS TRANSMISSION

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 246 days.

(21) Appl. No.: 17/279,497

(22) PCT Filed: Sep. 13, 2019

(86) PCT No.: PCT/JP2019/036078
§ 371 (c)(1),
(2) Date: Mar. 24, 2021

(87) PCT Pub. No.: WO2020/066693
PCT Pub. Date: Apr. 2, 2020

(65) Prior Publication Data
US 2021/0399942 A1   Dec. 23, 2021

(30) Foreign Application Priority Data
Sep. 25, 2018   (JP) .................................. 2018-179462

(51) Int. Cl.
*H04L 41/0659*   (2022.01)
*B60R 16/023*    (2006.01)
(Continued)

(52) U.S. Cl.
CPC ...... *H04L 41/0659* (2013.01); *B60R 16/0232* (2013.01); *H04B 3/36* (2013.01); *H04B 7/14* (2013.01)

(58) Field of Classification Search
CPC . H04L 41/0659; H04L 12/28; H04L 41/0663; H04B 3/36; H04B 7/14; H04B 7/15528; B60R 16/0232; B60R 16/023
See application file for complete search history.

(56) References Cited

U.S. PATENT DOCUMENTS

| 10,437,680 B2 * | 10/2019 | Kito | ........................ H04L 67/34 |
| 2006/0276947 A1 * | 12/2006 | Kaita | ................... H01H 47/002 701/36 |

(Continued)

FOREIGN PATENT DOCUMENTS

JP   2015-5825 A   1/2015

OTHER PUBLICATIONS

"Secure Wireless Vehicle Monitoring and Control"; Guo et al.; 2009 IEEE Asia-Pacific Services Computing Conference (APSCC); Conference dates Dec. 7-11, 2009 (Year: 2009).*

(Continued)

*Primary Examiner* — Benjamin H Elliott, IV
(74) *Attorney, Agent, or Firm* — Honigman LLP (57) ABSTRACT

A relay apparatus system is a relay apparatus system that is mounted in a vehicle, and includes: a wireless relay apparatus that wirelessly communicates with a communication apparatus provided outside of the vehicle; and a plurality of wired relay apparatuses that are connected in series downstream of the wireless relay apparatus when the communication apparatus is assumed to be positioned upstream of the wireless relay apparatus, wherein each of the plurality of wired relay apparatuses includes a communication unit that (Continued)

is communicably connected to an ECU for controlling an in-vehicle apparatus that is mounted in the vehicle.

15 Claims, 4 Drawing Sheets (51) Int. Cl.
  *H04B 3/36* (2006.01)
  *H04B 7/14* (2006.01)

(56) References Cited

U.S. PATENT DOCUMENTS

| | | | |
|---|---|---|---|
| 2014/0020655 A1* | 1/2014 | Ito | F02D 41/22 123/339.1 |
| 2015/0222349 A1* | 8/2015 | Sloan | H04W 4/40 455/7 |
| 2015/0372975 A1* | 12/2015 | Moriya | H04L 63/0281 726/11 |
| 2018/0074929 A1* | 3/2018 | Kito | G06F 21/568 |
| 2018/0187643 A1* | 7/2018 | Schuler | G01D 5/145 |
| 2020/0017115 A1* | 1/2020 | Higashitani | B60R 16/03 |
| 2021/0399942 A1* | 12/2021 | Yasunori | H04B 3/36 |

OTHER PUBLICATIONS

English translation of the international search report (ISR) for PCT/CN2018/109465; dated Apr. 17, 2019 (Year: 2019).*
International Search Report, Application No. PCT/JP2019/036078 dated Dec. 3, 2019. ISA/Japan Patent Office.

* cited by examiner

| ASIL level | illustration of corresponding ECU |
|---|---|
| QM | entertainment ECU, air-conditioner ECU |
| ASIL-A | body ECU for control of door mirrors, etc. |
| ASIL-B | traveling control ECU related to drive control |
| ASIL-C | traveling control ECU related to brake control, etc. |
| ASIL-D | automated driving ECU related to automated driving control |

RELAY APPARATUS AND SYSTEM FOR DETECTING ABNORMALITIES DUE TO AN UNAUTHORIZED WIRELESS TRANSMISSION

CROSS-REFERENCE TO RELATED APPLICATIONS

This application is the U.S. national stage of PCT/JP2019/036078 filed on Sep. 13, 2019, which claims priority of Japanese Patent Application No. JP 2018-179462 filed on Sep. 25, 2018, the contents of which are incorporated herein.

TECHNICAL FIELD

The present disclosure relates to a relay apparatus system and a relay apparatus.

BACKGROUND

ECUs (Electronic Control Units) for controlling in-vehicle devices such as powertrain devices for engine control and the like and body devices for air-conditioner control and the like are mounted in a vehicle. Furthermore, in the case of a vehicle that has an automated driving function, an ECU that controls an in-vehicle device for performing automated driving is mounted in the vehicle. These ECUs are connected by an in-vehicle network of CAN (Controller Area Network), Ethernet (registered trademark), or the like, and are connected to a communication apparatus (provision apparatus) positioned outside of the vehicle, via an external network by a relay apparatus that has a wireless function (TCU/Telematics. Communication Unit) (for example, JP 2017-97851A).

Regarding relay apparatuses of JP 2017-97851A, when a communication apparatus positioned outside of a vehicle is assumed to be on the upstream side, the relay apparatuses on the downstream side are connected respectively to two segments that constitute an in-vehicle network (internal network) of the vehicle, and are connected communicably to ECUs (Electronic Control Apparatuses) respectively connected to the two segments.

The relay apparatuses of JP 2017-97851A are respectively connected to ECUs, and thus there is a concern that the relay apparatuses may lack in robustness.

The present disclosure has been made in view of such circumstances, and aims to provide a relay apparatus system and a relay apparatus that can improve the robustness against attacks made through unauthorized communication from outside of a vehicle.

SUMMARY

A relay apparatus system according to one aspect of the present disclosure is a relay apparatus system that is mounted in a vehicle, and includes a wireless relay apparatus that wirelessly communicates with a communication apparatus provided outside of the vehicle, and a plurality of wired relay apparatuses that are connected in series downstream of the wireless relay apparatus when the communication apparatus is assumed to be positioned upstream of the wireless relay apparatus, and each of the plurality of wired relay apparatuses includes a communication unit that is communicably connected to an ECU for controlling an in-vehicle apparatus that is mounted in the vehicle.

First, embodiments of the present disclosure will be listed and described. At least some of the embodiments described below may be suitably combined.

A relay apparatus system according to one aspect of the present disclosure is a relay apparatus system that is mounted in a vehicle, and includes a wireless relay apparatus that wirelessly communicates with a communication apparatus provided outside of the vehicle, and a plurality of wired relay apparatuses that are connected in series downstream of the wireless relay apparatus when the communication apparatus is assumed to be positioned upstream of the wireless relay apparatus, and each of the plurality of wired relay apparatuses includes a communication unit that is communicably connected to an ECU for controlling an in-vehicle apparatus that is mounted in the vehicle.

According to this aspect, when the communication apparatus is assumed to be upstream of the wireless relay apparatus, the plurality of wired relay apparatuses are connected in series downstream of the wireless relay apparatus. Therefore, even when the wireless relay apparatus is attacked through unauthorized communication from outside of the vehicle and enters an abnormal state, the plurality of wired relay apparatuses connected in series downstream of the wireless relay apparatus sequentially serve as a barrier against such attacks, and thus it is possible to improve the robustness against such attacks.

In the relay apparatus system according to another aspect of the present disclosure, a priority of an ECU that is connected to a first wired relay apparatus out of the plurality of wired relay apparatuses is lower, in terms of travelling safety of the vehicle, than a priority of an ECU that is connected to a second wired relay apparatus that is directly connected downstream of the first wired relay apparatus.

According to this aspect, the priority of the ECU that is connected to the first wired relay apparatus is set lower than the priority of the ECU that is connected to the second wired relay apparatus that is directly connected downstream of the first wired relay apparatus. Therefore, even when the wireless relay apparatus positioned on the most upstream side is attacked through unauthorized communication from outside of the vehicle, it is possible to improve the robustness against such attacks by protecting an ECU that has a higher priority in terms of the travelling safety of the vehicle, as a result of disposing, on the downstream side, the wired relay apparatus that is connected to the higher-priority ECU.

In the relay apparatus system according to another aspect of the present disclosure, a priority in terms of travelling safety of the ECU is determined based on ASIL (Automotive Safety Integrity Level) of ISO26262.

According to this aspect, the priority in terms of travelling safety is determined based on ASIL of ISO26262, and thus it is possible to provide a relay apparatus system that can promote function safety of an ECU that complies with ISO26262.

In the relay apparatus system according to another aspect of the present disclosure, the ECUs include a travelling control ECU for travelling control of the vehicle, and a wired relay apparatus that is connected to the travelling control ECU is connected on the downstream side.

According to this aspect, the wired relay apparatus that is connected to the travelling control ECU is connected on the downstream side, and thus it is possible to efficiently protect the travelling control ECU.

In the relay apparatus system according to another aspect of the present disclosure, each of the wireless relay apparatus and the plurality of wired relay apparatuses includes a communication disconnection unit that disconnects communication thereof, and each of the plurality of wired relay apparatuses includes a determination unit that performs abnormality determination of the wireless relay apparatus or another wired relay apparatus that is connected upstream of the wired relay apparatus to which the determination unit belongs, and a signal output unit that, if the determination unit determines that the other wired relay apparatus or the wireless relay apparatus is abnormal, outputs a signal for disconnecting communication to the communication disconnection unit of the other wired relay apparatus or the wireless relay apparatus determined as being abnormal.

According to this aspect, each of the wireless relay apparatus and the wired relay apparatuses includes a communication disconnection unit that disconnects communication thereof. The determination unit of each of the wired relay apparatuses performs abnormality determination of another wired relay apparatus connected on the upstream side or wireless relay apparatus, and if it is determined that there is an abnormality, the signal output unit of each of the wired relay apparatuses outputs a signal for disconnecting communication. Therefore, it is possible to improve the robustness by disabling the wireless relay apparatus or wired relay apparatus that is abnormal from communicating, and protect one or more wired relay apparatuses positioned downstream of the wireless relay apparatus or wired relay apparatus that is abnormal. In addition, as a result of connecting an ECU that has a higher priority in terms of travelling safety, to a wired relay apparatus positioned on the downstream side, it is possible to efficiently protect the higher-priority ECU, and keep the travelling safety of the vehicle from being inhibited even when the wireless relay apparatus is attacked through unauthorized communication from outside of the vehicle and enters an abnormal state.

In the relay apparatus system according to another aspect of the present disclosure, the communication disconnection unit includes a switch for switching on or off a power supply related to communication of the apparatus to which the communication disconnection unit belongs, and the signal output unit outputs an off signal for switching off the power supply to the switch so as to disconnect communication.

According to this aspect, the communication disconnection unit includes the switch for switching on or off the power supply related to communication of the wireless relay apparatus or wired relay apparatus to which the communication disconnection unit belongs, and thus the communication disconnection unit can have a simple configuration.

In the relay apparatus system according to one aspect of the present disclosure, after a predetermined period has elapsed from when the off signal was output, or after a predetermined operation has been carried out, the signal output unit outputs an on signal for switching on the power supply to the switch that output the off signal, so as to resume communication.

According to this aspect, after the predetermined period has elapsed from when an off signal was output, the signal output unit outputs an on signal for switching on the power supply to the switch that has output the off signal, and thus, when the abnormality of the wireless relay apparatus or wired relay apparatus is temporary, it is possible to resume and recover communication of the wireless relay apparatus or wired relay apparatus. After communication is resumed, the determination unit performs abnormality determination on the wired or wireless relay apparatus that has resumed communication, and thus if the abnormality continues, it is possible to switch off the power supply of the wired or wireless relay apparatus, and protect one or more other wired relay apparatuses connected downstream of the wired or wireless relay apparatus.

A relay apparatus according to another aspect of the present disclosure is one relay apparatus out of a plurality of relay apparatuses that are disposed in a vehicle, are communicably connected to each other in series, and include a relay apparatus that wirelessly communicates with a communication apparatus provided outside of the vehicle, and the one relay apparatus receives a signal related to disconnection of communication of the one relay apparatus, or outputs a signal related to disconnection of communication of another relay apparatus directly connected to the one relay apparatus.

According to this aspect, as a result of the one relay apparatus receiving a signal related to disconnection of communication of the one relay apparatus, or outputting a signal related to disconnection of communication of another relay apparatus connected to the one relay apparatus, it is possible to improve the robustness of a relay apparatus system constituted by these relay apparatuses.

The relay apparatus according to another aspect of the present disclosure includes a wireless relay apparatus that wirelessly communicates with a communication apparatus provided outside of the vehicle, and, when the communication apparatus is assumed to be on an upstream side, the wireless relay apparatus is connected on the most upstream side relative to the other relay apparatuses, and each of the relay apparatuses includes a communication disconnection unit that receives a signal related to disconnection of communication output from another relay apparatus directly connected to the relay apparatus to which the communication disconnection unit belongs, and disconnects communication of the relay apparatus to which the communication disconnection unit belongs.

According to this aspect, as a result of providing the communication disconnection unit that receives a signal related to disconnection of communication output from another relay apparatus directly connected to the relay apparatus to which the communication disconnection unit belongs, and disconnects communication of the relay apparatus, it is possible to improve the robustness of the relay apparatus system constituted by these relay apparatuses.

The relay apparatus according to another aspect of the present disclosure includes a communication unit that is communicably connected to an ECU for controlling an in-vehicle apparatus that is mounted in the vehicle, a communication disconnection unit that receives a signal related to disconnection of communication output from a relay apparatus directly connected downstream of the relay apparatus to which the communication disconnection unit belongs, when a relay apparatus that wirelessly communicates with a communication apparatus provided outside of the vehicle is assumed to be positioned on an upstream side, and disconnects communication of the relay apparatus to which the communication disconnection unit belongs, a determination unit that performs abnormality determination on a relay apparatus directly connected upstream of the relay apparatus to which the determination unit belongs, and a signal output unit that outputs a signal related to disconnection of communication to the upstream relay apparatus when the determination unit determines that the upstream relay apparatus is abnormal.

According to this aspect, as a result of a communication disconnection unit receiving a signal related to disconnection of communication output from a relay apparatus directly connected downstream of the relay apparatus to which the communication disconnection unit belongs, and disconnecting communication of the communication disconnection unit, it is possible to improve the robustness of the relay apparatus system constituted by these relay apparatuses.

The relay apparatus according to one aspect of the present disclosure includes a communication unit that is communicably connected to an ECU for controlling an in-vehicle apparatus that is mounted in the vehicle, the communication unit being connected on the most downstream side when a relay apparatus that wirelessly communicates with a communication apparatus provided outside of the vehicle is assumed to be on an upstream side, a determination unit that performs abnormality determination of a relay apparatus that is directly connected upstream of the relay apparatus to which the determination unit belongs, and a signal output unit that outputs a signal related to disconnection of communication to the upstream relay apparatus when the determination unit determines that the upstream relay apparatus is abnormal.

According to this aspect, if a determination unit determines that a relay apparatus directly connected upstream of the relay apparatus to which the determination unit belongs is abnormal, as a result of outputting a signal related to disconnection of communication to the upstream relay apparatus, it is possible to improve the robustness of the relay apparatus system constituted by these relay apparatuses.

Advantageous Effects of Disclosure

According to one aspect of the present disclosure, when a communication apparatus is assumed to be upstream of a wireless relay apparatus, a plurality of wired relay apparatuses are connected in series downstream of the wireless relay apparatus. Therefore, even when the wireless relay apparatus is attacked through unauthorized communication from outside of the vehicle, and enters an abnormal state, the plurality of wired relay apparatuses connected in series downstream of the wireless relay apparatus sequentially serve as a barrier against such attacks, and thus it is possible to improve the robustness against such attacks.

DETAILED DESCRIPTION OF PREFERRED EMBODIMENTS

The present disclosure will be described in detail with reference to the drawings illustrating embodiments of the present disclosure. A relay apparatus system S and a relay apparatus according to an embodiment of the present disclosure will be described below with reference to the drawings. Note that the present disclosure is not limited to illustrations of these, but is indicated by the claims, and is intended to include all modifications that are within the meanings and the scope that are equivalent to those of the claims.

First Embodiment

Figure 1:
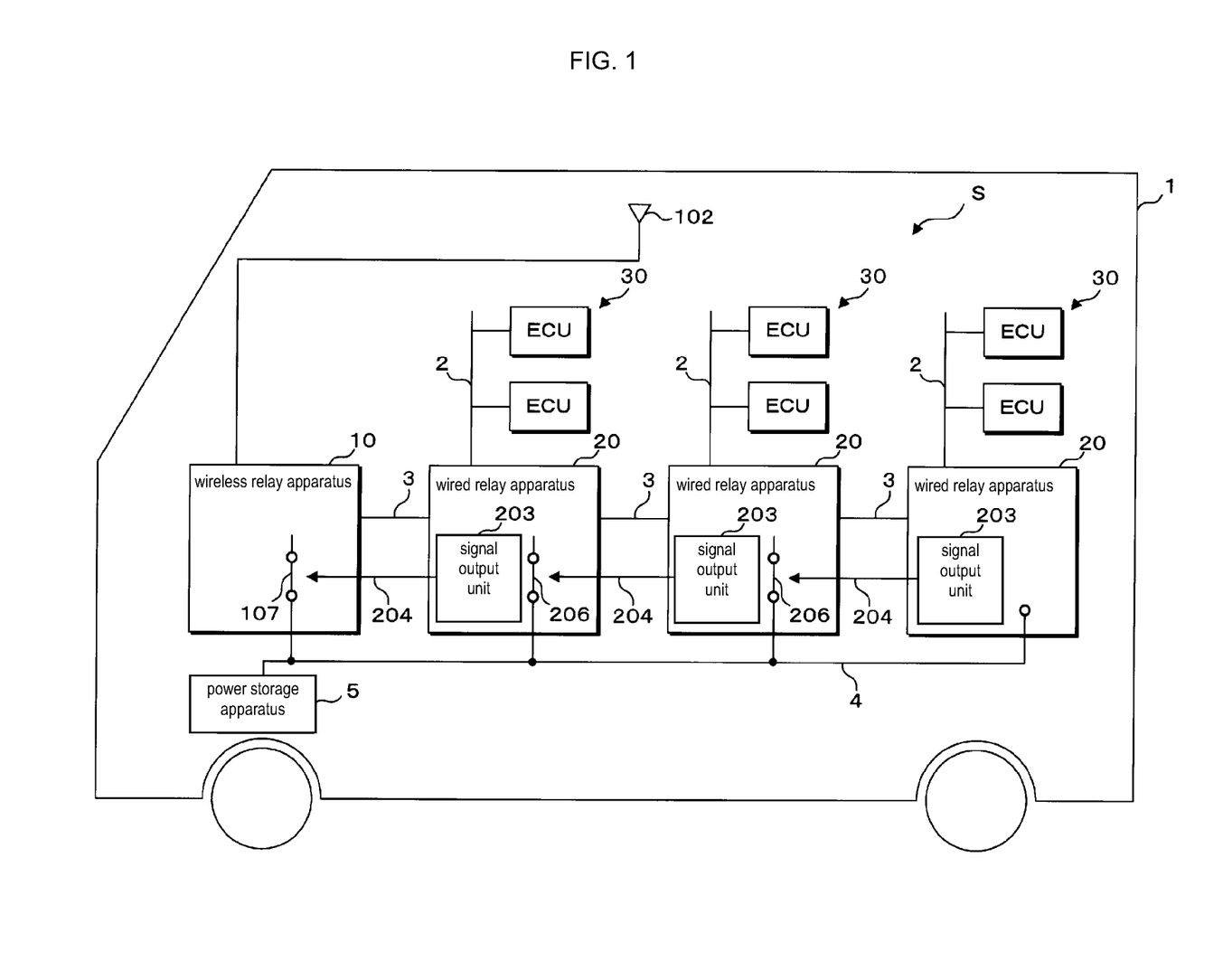
FIG. 1 is a schematic diagram showing a configuration of a relay apparatus system according to a first embodiment.

An embodiment will be described below with reference to the drawings. FIG. 1 is a schematic diagram showing a configuration of a relay apparatus system S according to a first embodiment. The relay apparatus system S is mounted in a vehicle 1, and includes a wireless relay apparatus 10 and a plurality of wired relay apparatuses 20. The wireless relay apparatus 10 and three wired relay apparatuses 20 are connected in parallel to a power storage apparatus 5 by a power supply line 4, and are supplied with power from the power storage apparatus 5.

The wireless relay apparatus 10 is connected to an antenna 102 for wirelessly communicating with a communication apparatus (not illustrated) outside the vehicle. The wireless relay apparatus 10 and the wired relay apparatuses 20 are connected in series, the wireless relay apparatus 10 being positioned at an end. Therefore, when the communication apparatus outside of the vehicle is assumed to be on the upstream side, the wireless relay apparatus 10 is positioned on the most upstream side, and the wired relay apparatuses 20 are connected in series downstream of the wireless relay apparatus 10. The wireless relay apparatus 10 is connected to the downstream wired relay apparatuses 20 by a communication line 3 such as an Ethernet. Each wired relay apparatus 20 is connected to the wireless relay apparatus 10 or another wired relay apparatuses 20 positioned upstream thereof by the communication line 3 such as an Ethernet. Furthermore, the wired relay apparatuses 20 other than the wired relay apparatus 20 positioned on the most downstream side are connected to another wired relay apparatus 20 positioned downstream thereof by the communication line 3. The wireless relay apparatus 10 and wired relay apparatuses 20 are connected by the communication line 3 in this manner, and thereby a network topology is formed in which the wireless relay apparatus 10 and the wired relay apparatuses 20 are connected in series. The wireless relay apparatus 10 wirelessly communicates with the communication apparatus outside the vehicle, and transmits (relays) various types of data received through wireless communication, to the wired relay apparatus 20.

Each wired relay apparatus 20 is communicably connected to ECUs 30 (Electronic Control Units) for controlling in-vehicle apparatuses, by an ECU wiring 2 such as a CAN (Controller Area Network/registered trademark) or an Ethernet. In FIG. 1, the wireless relay apparatus 10 is disposed on the upstream side, and the three wired relay apparatuses 20 are connected in series, and the ECUs 30 connected to the three wired relay apparatuses 20 are arranged from the downstream side to the upstream side, in the order of highest priority in terms of the travelling safety of the vehicle 1. Accordingly, the ECUs 30 of the wired relay apparatus 20 connected on the most downstream side have a higher priority than the ECUs 30 of the other wired relay apparatuses 20, in terms of the travelling safety of the vehicle 1. Also, the ECUs 30 of the wired relay apparatus 20 directly connected to the wireless relay apparatus 10 have a lower priority than the ECUs 30 of the other wired relay apparatuses 20 in terms of the travelling safety of the vehicle 1. Note that the number of wired relay apparatuses 20 that are connected in series is not limited to three, and may be two or larger.

Each wired relay apparatus 20 receives data transmitted from the wireless relay apparatus 10, in other words data transmitted from the communication apparatus outside of the vehicle and relayed by the wireless relay apparatus 10, and transmits the data to the ECU 30s connected to the wired relay apparatus 20. Therefore, each ECU 30 communicates with the communication apparatus outside of the vehicle via the wireless relay apparatus 10 and wired relay apparatuses 20. The wireless relay apparatus 10 and wired relay apparatuses 20 relay communication between an ECU 30 and the communication apparatus outside of the vehicle.

Each wired relay apparatus 20 includes a signal output unit 203 that outputs a signal for disconnecting communication of the wireless relay apparatus 10 or a wired relay apparatus 20, to the wireless relay apparatus 10 or the wired relay apparatus 20 directly connected upstream of the wired relay apparatus 20 to which the signal output unit 203 belongs. Each wired relay apparatus 20 monitors the wireless relay apparatus 10 or wired relay apparatus 20 directly connected upstream thereof, and when an abnormality occurs in the wireless relay apparatus 10 or wired relay apparatus 20, the signal output unit 203 outputs a signal via a signal line so as to disconnect communication of the wireless relay apparatus 10 or wired relay apparatus 20 in which the abnormality has occurred. Therefore, communication between the relay apparatus to which the signal output unit 203 belongs and the wireless relay apparatus 10 or wired relay apparatus 20 directly connected upstream of the relay apparatus to which the signal output unit 203 belongs is disconnected. Such disconnection of communication will be described later in detail.

Figure 2:
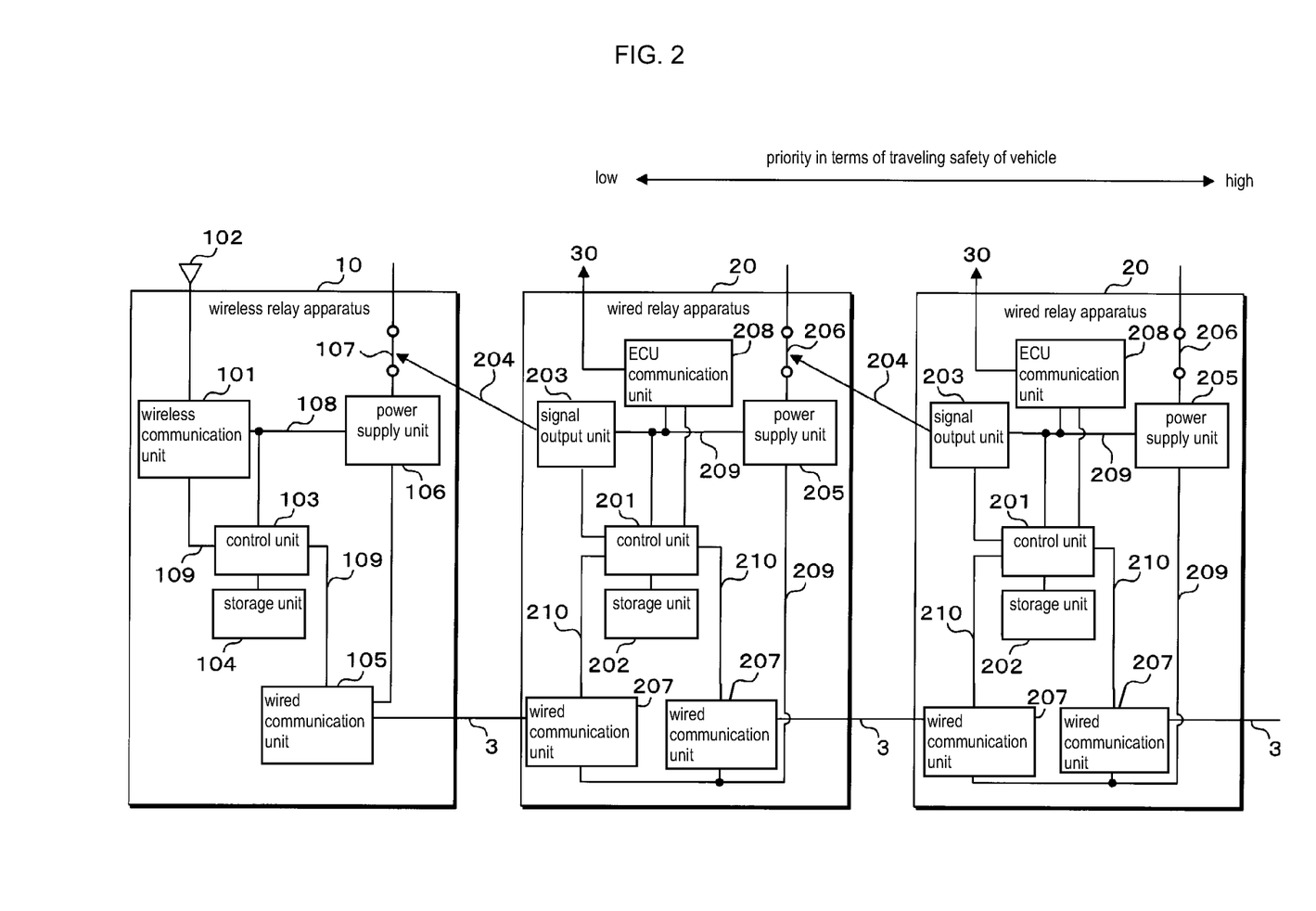
FIG. 2 is a block diagram showing configurations of a wireless relay apparatus and wired relay apparatuses.

FIG. 2 is a block diagram showing configurations of the wireless relay apparatus 10 and wired relay apparatuses 20. The wireless relay apparatus 10 includes a wireless communication unit 101, a control unit 103, a storage unit 104, a wired communication unit 105, a power supply unit 106, and a power switch 107, and is connected to the antenna 102. Note that the wireless relay apparatus 10 may include the antenna 102.

The wireless communication unit 101 is connected to the antenna 102 for wirelessly communicating with the communication apparatus outside of the vehicle, using a harness or the like. The wireless communication unit 101 wirelessly communicates with the communication apparatus outside of the vehicle, using a predetermined broadband communication standard such as 5G, 4G, or LTE, and is a communication device called a TCU (Telematics Communication Unit), for example.

The control unit 103 is constituted by a CPU (Central Processing Unit) or an MPU (Micro Processing Unit), and the like, and performs various types of control processing, computation processing, and the like by reading out and executing control programs and data stored in the storage unit 104 in advance. The control unit 103 is communicably connected to the wireless communication unit 101, the wired communication unit 105, and the storage unit 104 by an internal bus 109. The control unit 103 performs control for relaying data transmitted/received between the wireless communication unit 101 and the wired communication unit 105, by executing a control program.

The control program includes a security program for ensuring the security of the apparatus in which the control program is stored. The control unit 103 exerts a security function so as to deal with, for example, DoS attacks and unauthorized communication (attacks) performed from outside of the vehicle using data that includes viruses, worms, and the like, and ensure the security (ascertain a secure communication state) of the apparatus to which the control unit 103 belongs, by executing the security program.

The storage unit 104 is constituted by a volatile memory element such as a RAM (Random Access Memory) or a non-volatile memory element such as a ROM (Read Only Memory), EEPROM (Electrically Erasable Programmable ROM), or a flash memory, and stores, in advance, the control program and data to be referenced at the time of processing. The control program stored in the storage unit 104 may be a control program read out from a recording medium (not illustrated) that can be read by the wireless relay apparatus 10, and stored in the storage unit 104. The control program may also be a control program downloaded from an external computer (not illustrated) connected to a communication network (not illustrated), and stored in the storage unit 104. The storage unit 104 stores route information for communicating with wired relay apparatuses 20 or ECUs 30, for example, in the form of a table. The route information includes the addresses of the wireless relay apparatus 10, the wired relay apparatuses 20, and the ECUs 30 connected to the wired relay apparatuses 20. Therefore, the control unit 103 can relay communication between an ECU 30 and the communication apparatus outside of the vehicle by referencing the route information stored in the storage unit 104.

The wired communication unit 105 is an input output I/F, for example, a communication port of the Ethernet, and an IEEE standard such as 100BASE-T1 or 1000BASE-T1 is used as the protocol of a physical layer.

The power supply unit 106 converts a voltage applied from the power storage apparatus 5 (see FIG. 1) into an operating voltage for the units included in the wireless relay apparatus 10 such as the control unit 103 and the wired communication unit 105, and distributes the operating voltage so as to supply power to these units via a power supply line 108.

The power switch 107 is provided on the power supply line 108 that connects the power supply unit 106 and the power storage apparatus 5. The power switch 107 is constituted by a semiconductor switch such as a mechanical relay or a FET (Field Effect Transistor). The power switch 107 is constantly on in conjunction with the ignition switch (IG switch) of the vehicle 1, for example, and is controlled on or off by a signal from the wired relay apparatus 20 directly connected on the downstream side, which will be described later. The power switch 107 is equivalent to a communication disconnection unit that disconnects communication of the apparatus to which the power switch 107 belongs.

Each wired relay apparatus 20 includes a control unit 201, a storage unit 202, the signal output unit 203, a power supply unit 205, a power switch 206, two wired communication units 207, and an ECU communication unit 208.

The control unit 201 of the wired relay apparatus 20 has a configuration similar to the above-described control unit 103 of the wireless relay apparatus 10. The control unit 201 of the wired relay apparatus 20 is communicably connected to the storage unit 202, the signal output unit 203, the wired communication units 207, and the ECU communication unit 208 by an internal bus 210. The control unit 201 performs control for relaying data transmitted/received between two wired communication units 207 or between a wired communication unit 207 and the ECU communication unit 208, by reading out and executing the control program and data recorded in the storage unit 202.

The control program of each wired relay apparatus 20 also includes a security program for ensuring the security of the wired relay apparatus 20 similarly to the control program of the wireless relay apparatus 10. The control unit 201 of the wired relay apparatus 20 exerts a security function so as to deal with unauthorized communication (attacks) with data that includes a viruses or the like, and secure the security of that wired relay apparatus 20.

The storage unit 202 of each wired relay apparatus 20 has a configuration similar to the above-described storage unit 104 of the wireless relay apparatus 10. The storage unit 202 of the wired relay apparatus 20 stores route information for communicating with wired relay apparatuses 20 or ECUs 30, for example, in the form of a table similar to the storage unit 104 of the wireless relay apparatus 10. The route information includes the addresses of the wireless relay apparatus 10, the wired relay apparatuses 20, and the ECUs 30 connected the wired relay apparatuses 20. Each wired relay apparatus 20 functions as a layer 2 switch or a layer 3 switch, for example. When the wired relay apparatus 20 functions as the layer 2 switch, the MAC addresses of the wireless relay apparatus 10 and a wired relay apparatus 20 or an ECU 30 are stored as route information in the storage unit 202. When the wired relay apparatus 20 functions as the layer 3 switch, the IP addresses of the wireless relay apparatus 10 and a wired relay apparatus 20 or an ECU 30 are stored as route information in the storage unit 202. Therefore, by referencing the route information stored in the storage unit 202, the control unit 201 of the wired relay apparatus 20 can relay communication between an ECU 30 connected to that wired relay apparatus 20 and the communication apparatus outside of the vehicle or communication between an ECU 30 connected to that wired relay apparatus 20 and an ECU 30 connected to another wired relay apparatus 20.

Each wired relay apparatus 20 includes the two wired communication units 207 respectively corresponding to the upstream side and the downstream side. These two wired communication units 207 comply with the same standard as the wired communication unit 105 of the wireless relay apparatus 10, and are an input output I/F, for example, a communication port of the Ethernet, and 100BASE-T1, 1000BASE-T1, or the like is used as the protocol of a physical layer.

The signal output unit 203 is a signal output circuit that outputs a signal for switching off or on the power switch 206 of another wired relay apparatus 20 or the wireless relay apparatus 10 directly connected upstream of the wired relay apparatus 20 to which that signal output unit 203 belongs, to that switch, based on an instruction from the control unit 201.

The signal output unit 203 of a wired relay apparatus 20 and the power switch 206 or 107 of another wired relay apparatus 20 or the wireless relay apparatus 10 directly connected upstream of the wired relay apparatus 20 to which the signal output unit 203 belongs are connected by a signal line 204. For example, if the power switches 206 and 107 are each configured by an FET (Field Effect Transistor), the signal output unit 203 is connected to the gate terminal of the FET by the signal line 204, and the FET is switched off or on by a signal output from the signal output unit 203, in other words a voltage that is applied to the gate terminal.

Note that, in FIG. 2, the signal output unit 203 is illustrated as a block (device) separate from the control unit 201, but there is no limitation thereto. The control unit 201 may be configured integrally as a microcomputer that includes a signal output circuit, and exert the function of the signal output unit 203.

The power supply unit 205 of each wired relay apparatus 20 converts a voltage applied from the power storage apparatus 5 into an operating voltage for the units included in the wired relay apparatus 20 such as the control unit 201 and the wired communication units 207, and distributes the operating voltage so as to supply power to these units via a power supply line 209.

The power switch 206 is provided on the power supply line 209 that connects the power supply unit 205 of the wired relay apparatus 20 and the power storage apparatus 5. The power switch 206 of the wired relay apparatus 20 is constituted by a mechanical relay or a semiconductor switch, similarly to the above-described power switch 107 of the wireless relay apparatus 10. The power switch 206 is constantly on in conjunction with the ignition switch (IG switch) of the vehicle 1, for example, and is controlled on or off by a signal from the wired the relay apparatus 20 directly connected on the downstream side. The power switch 206 is equivalent to a communication disconnection unit that disconnects communication of the apparatus to which that power switch 206 belongs.

The ECU communication unit 208 is an input output I/F that complies with a predetermined communication protocol of the Ethernet, CAN, or the like. The ECU communication unit 208 and the ECUs 30 are communicably connected by the ECU wiring 2 such as a CAN cable. The ECU communication unit 208 is equivalent to a communication unit that communicably connects a wired relay apparatus 20 and an ECU 30.

Each wired relay apparatus 20 includes a determination unit that performs abnormality determination of another wired relay apparatus 20 or the wireless relay apparatus 10 directly connected upstream of the wired relay apparatus 20. The determination unit monitors the other wired relay apparatuses 20 or the wireless relay apparatus 10, and, if the other wired relay apparatuses 20 or the wireless relay apparatus 10 enters an abnormal state due to a virus or the like, the determination unit performs abnormality determination. Regarding monitoring and abnormality determination of the other wired relay apparatus 20 or the wireless relay apparatus 10 that are performed by the determination unit, for example, inter-process communication is performed based on a security program or a self-diagnosis program (diagnostic process) that is being executed in the other wired relay apparatus 20 or the wireless relay apparatus 10 directly connected on the upstream side, so as to perform monitoring, and abnormality determining is performed based on the result of inter-process communication. Alternatively, the determination unit may also cyclically perform polling communication to another wired relay apparatus 20 or the wireless relay apparatus 10 directly connected upstream, execute check sum, confirm a response to the execution result, and perform monitoring and abnormality determination. Alternatively, the determination unit may also obtain data transmitted from the other wired relay apparatus 20 or the wireless relay apparatus 10 directly connected upstream, evaluate the validity of the authentication key of obtained data, and thereby perform abnormality determination. Alternatively, if the wireless relay apparatus 10 and the wired relay apparatuses 20 have an IDS (Intrusion Detection System) function, the determination unit may obtain data regarding the IDS (Intrusion Detection System) transmitted from the other wired relay apparatus 20 or the wireless relay apparatus 10 directly connected on the upstream side, evaluate the obtained data, and thereby perform abnormality determination.

Such an abnormality occurs when the security function of the wireless relay apparatus 10 and the wired relay apparatuses 20 is broken by an attack by a virus or the like from outside of the vehicle, in other words when the security function is disabled. When the determination unit determines that an abnormality has occurred in the other wired relay apparatus 20 or the wireless relay apparatus 10 directly connected on the upstream side, the signal output unit 203 outputs a signal for switching off the power switch 206 or 107 of the other wired relay apparatus 20 or the wireless relay apparatus 10 directly connected on the upstream side, in other words, a signal for disconnecting communication, based on an instruction from the control unit 201. Therefore, as a result of switching off the power supply of the wireless relay apparatus 10 or wired relay apparatus 20 in which an abnormality has occurred and disconnecting communication, it is possible to prevent an abnormality from occurring in a wired relay apparatus 20 positioned downstream of the wireless relay apparatus 10 or wired relay apparatus 20 in which the abnormality has occurred. The control unit 201 of the wired relay apparatus 20 functions as a determination unit by executing the control program.

ECUs 30 are connected to the plurality of wired relay apparatuses 20 via the ECU communication unit 208. Each ECU 30 is constituted by a program for controlling the corresponding in-vehicle apparatus and a microcomputer or the like for executing the program.

Figure 3:
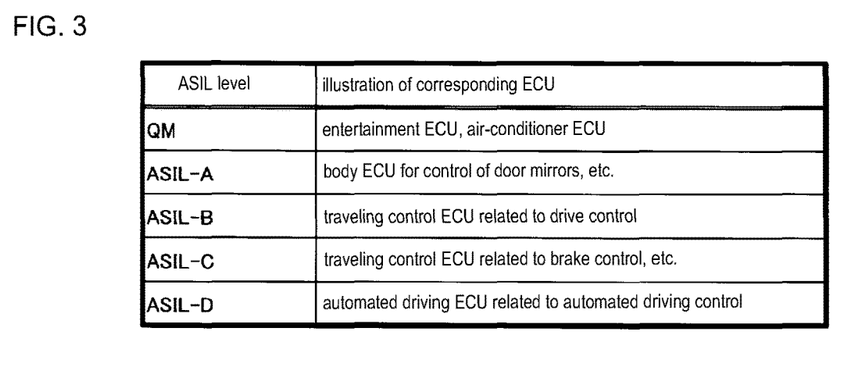
FIG. 3 is an explanatory diagram related to the priorities of ECUs in terms of travelling safety.

FIG. 3 is an explanatory diagram related to the priority of an ECU 30 in terms of the travelling safety. The priority of an ECU 30 in terms of the travelling safety of the vehicle 1 is determined based on a corresponding in-vehicle apparatus and the function of a program to be executed, and may also be determined based on ASIL (Automotive Safety Integrity Level) of ISO26262, for example. As shown in FIG. 3, ASIL levels are classified into QM, ASIL-A, ASIL-B, ASIL-C, and ASIL-D levels. The QM level indicates normal quality management to which the function safety of ISO26262 does not need to be applied. ASIL-A to ASIL-D levels are levels at which the function safety of ISO26262 needs to be applied, and as the level shifts from ASIL-A to ASIL-D, the function safety requirements become more severe. Accordingly, the priority at the QM level can be regarded the lowest, and the priority at the ASIL-D level can be regarded the highest.

Regarding ECUs 30 corresponding to the ASIL levels, examples of an ECU 30 corresponding to the QM level include an entertainment ECU 30 that controls moving image data or stream data, such as a car navigation or a TV, and an air-conditioner ECU 30 that controls a car air-conditioner. Examples of an ECU 30 corresponding to the ASIL-A level include a body ECU 30 that performs position control of seats or control of door mirrors and the like. Examples of an ECU 30 corresponding to the ASIL-B level include a travelling control ECU 30 related to drive control of an engine, a motor, and the like. Examples of an ECU 30 corresponding to the ASIL-C level include a travelling control ECU 30 related to steering wheel control or brake control, and the like. Examples of an ECU 30 corresponding to the ASIL-D level include an automated driving ECU 30 related to automated driving control.

Note that, regarding the priorities of ECUs 30 in terms of the travelling safety of the vehicle 1, the automated driving ECU 30 is set to the highest priority, an ECU 30 that performs control related to rotation (turning) or stopping of the vehicle 1 is set to the second highest priority, and an ECU 30 that performs control related to travelling (travel) of the vehicle 1 is set to the third highest priority. In addition, an ECU 30 that performs control other than those may be set to the lowest priority.

ECUs 30 corresponding to the priorities in terms of the travelling safety of the vehicle 1 are connected to the plurality of wired relay apparatuses 20 connected in series. For example, the ECU 30 that has the lowest priority such as the entertainment ECU 30 or the air-conditioner ECU 30 is connected to the ECU communication unit 208 of the wired relay apparatus 20 directly connected to the wireless relay apparatus 10. An ECU 30 that has a high priority such as the automated driving ECU 30 or the travelling control ECU 30 is connected to the ECU communication unit 208 of the wired relay apparatus 20 positioned on the most downstream side. An ECU 30 that has an intermediate priority such as the body ECU 30 is connected to the ECU communication unit 208 of the wired relay apparatus 20 positioned at an intermediate position of a network topology configured in series.

The wired communication unit 105 of the wireless relay apparatus 10 and the wired communication units 207 upstream of the wired relay apparatus 20 directly connected downstream of the wireless relay apparatus 10 are connected by the communication line 3. The wired relay apparatuses 20 are connected by the downstream wired communication unit 207 of the wired relay apparatus 20 positioned on the upstream side and the upstream wired communication unit 207 of the wired relay apparatus 20 positioned in the downstream, in other words, the communication line 3 arranged between these wired communication units 207.

The two wired communication units 207 of each wired relay apparatus 20 are connected to the control unit 201 by the internal bus 210, and data that flows through the two wired communication units 207 is transmitted via the control unit 201, in other words, relayed by the control unit 201. Therefore, when the wired relay apparatus 20 positioned on the most downstream side communicates with the communication apparatus outside of the vehicle, data in communication with the communication apparatus is relayed by the wireless relay apparatus 10 and another wired relay apparatus 20, and is transmitted to the wired relay apparatus 20 positioned on the most downstream side. Specifically, the wireless relay apparatus 10 and the plurality of wired relay apparatuses 20 are connected in series, the wireless relay apparatus 10 being positioned at an end, and communication of the wireless relay apparatus 10 and the plurality of wired relay apparatuses 20 connected in series is performed using a bucket-brigade method. Therefore, for example, in order for the wired relay apparatus 20 positioned on the most downstream side to receive data that is from the communication apparatus outside of the vehicle and is received and relayed by the wireless relay apparatus 10, the data is relayed by other wired relay apparatuses 20 positioned upstream of the wired relay apparatus 20.

Each of the wired relay apparatuses 20 has the security function, and thus, even when a wired relay apparatus 20 is attacked through unauthorized communication or the like from outside of the vehicle, the other wired relay apparatuses 20 positioned upstream of the wired relay apparatus 20 sequentially serve as a firewall-like barrier against such an attack, and thus it is possible to improve the robustness.

Furthermore, as a result of disposing, on the downstream side, the wired relay apparatus 20 that is connected to an ECU 30 that has a high priority in terms of the travelling safety of the vehicle 1, it is possible to improve the robustness against such an attack by protecting the high-priority ECU 30.

In addition, for example, as a result of connecting, on the downstream side, the wired relay apparatus 20 that is connected to the travelling control ECU 30 for travelling control of the vehicle 1 or the automated driving ECU 30 for performing automated driving, as the ECU 30 that has a high priority in terms of travelling safety of the vehicle 1, it is possible to efficiently protect the travelling control ECU 30 or the automated driving ECU 30.

Note that, as shown in FIG. 2, the wired relay apparatus 20 that is connected on the most downstream side may only include the wired communication units 207 for connection to another wired relay apparatus 20 positioned on the upstream side. In addition, the wired relay apparatus 20 connected on the most downstream side does not need to include the power switch 206. The wired relay apparatus 20 that is connected on the most downstream side is connected to, for example, the ECU 30 that has the highest priority in terms of the travelling safety of the vehicle 1, such as the automated driving ECU 30, and thus, even when communication with another wired relay apparatus 20 connected upstream of the wired relay apparatus 20 on the most downstream side is disconnected, it is possible to secure communication with ECUs 30 that have the highest priority.

Figure 4:
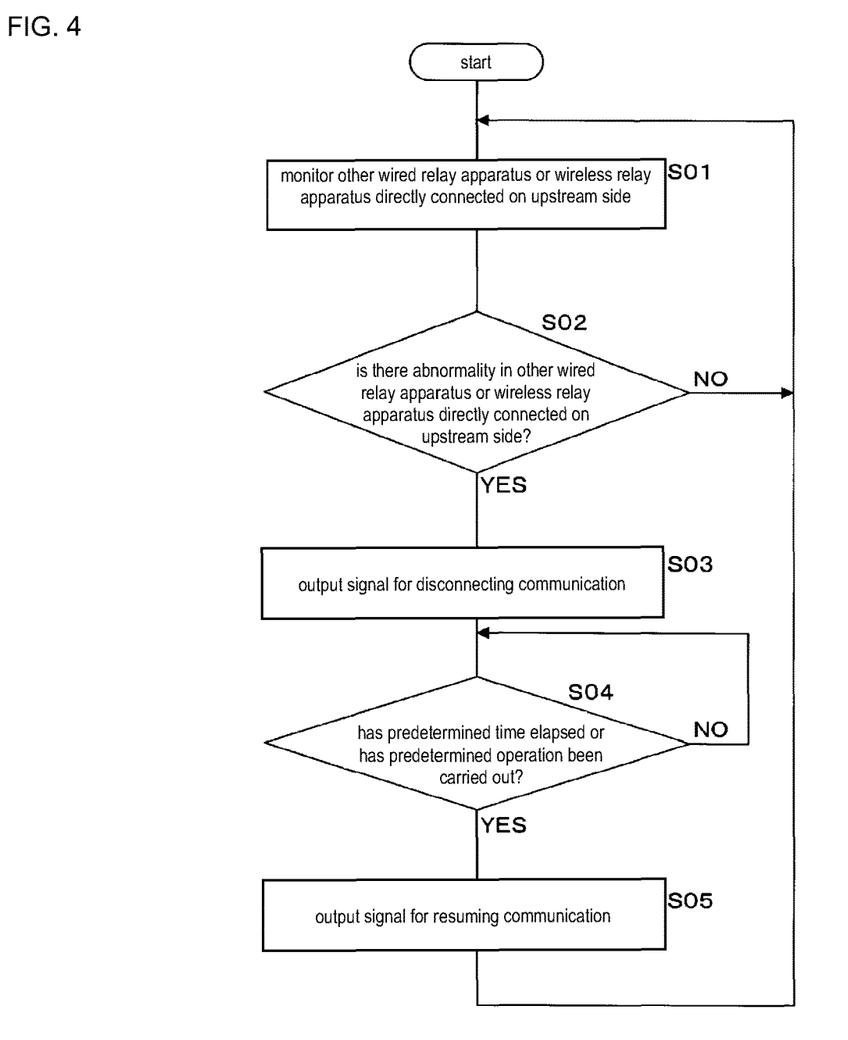
FIG. 4 is a flowchart showing the processing of a control unit according to the first embodiment.

FIG. 4 is a flowchart showing processing of the control unit 201 according to the first embodiment. The control unit 201 of a wired relay apparatus 20 performs the following processing based on a predetermined input signal, constantly or when the ignition switch (IG switch) is switched on, for example.

The control unit 201 of each wired relay apparatus 20 starts monitoring another wired relay apparatus 20 or the wireless relay apparatus 10 directly connected upstream of the wired relay apparatus 20 to which the control unit 201 belongs (step S01). Accordingly, the wired relay apparatus 20 directly connected downstream of the wireless relay apparatus 10 monitors the wireless relay apparatus 10. The wired relay apparatuses 20 other than that wired relay apparatus 20 monitor another wired relay apparatus 20 directly connected upstream thereof. The control unit 201 performs monitoring of another wired relay apparatus 20 or the wireless relay apparatus 10 directly connected upstream of the wired relay apparatus 20 to which the control unit 201 belongs, using various methods, for example, polling to the other wired relay apparatus 20 or the wireless relay apparatus 10, obtaining data transmitted from the other wired relay apparatus 20 or the wireless relay apparatus 10, or inter-process communication using a self-diagnosis program that is being executed by the other wired relay apparatus 20 or the wireless relay apparatus 10.

The control unit 201 determines whether or not there is an abnormality in another wired relay apparatus 20 or the wireless relay apparatus 10 directly connected on the upstream side (step S02). The control unit 201 confirms a response to polling communication from the other wired relay apparatus 20 or the wireless relay apparatus 10, for example, and performs the abnormality determination based on the confirmation result. Alternatively, the control unit 201 may perform abnormality determination using various methods, for example, by evaluating the validity of the authentication key of data transmitted from the other wired relay apparatus 20 or the wireless relay apparatus 10.

If it is determined that there is no abnormality, in other words the state is normal (step S02: NO), the control unit 201 performs loop processing to execute the process in step S01 again.

If it is determined that there is an abnormality (step S02: YES), the control unit 201 outputs a signal for disconnecting communication to the other wired relay apparatus 20 or the wireless relay apparatus 10 directly connected upstream of the wired relay apparatus 20 to which that control unit 201 belongs (step S03). On receiving an instruction from the control unit 201, the signal output unit 203 outputs a signal for switching off the power switch 206 or 107 of the other wired relay apparatus 20 or the wireless relay apparatus 10 directly connected upstream of the wired relay apparatus 20 to which the signal output unit 203 belongs, to that power switch 206 or 107. The power switch 206 or 107 of the other wired relay apparatus 20 or the wireless relay apparatus 10 that received the output signal is switched off. Therefore, communication between the wired relay apparatus 20 that includes the control unit 201 that has output that signal and the other wired relay apparatus 20 or the wireless relay apparatus 10 directly connected upstream of the wired relay apparatus 20 is shut off.

Regarding the wired relay apparatus 20 or the wireless relay apparatus 10 in which the power switch 206 or 107 has been switched off is not operating properly due to a virus or the like, there is a concern that a virus or the like will spread to another wired relay apparatus 20 or ECU 30. In contrast, as a result of switching off the power supply of the wired relay apparatus 20 or the wireless relay apparatus 10 in which an abnormality has occurred, it is possible to disconnect communication with another wired relay apparatus 20 or ECU 30, and prevent a virus or the like from spreading to another wired relay apparatus 20 or ECU 30.

The control unit 201 that has output the signal for disconnecting communication may also store information regarding output of that signal or information regarding abnormality determination, in the storage unit 202. The information regarding output of the signal and the like is information to be used for analyzing the cause of the occurrence of the abnormality, such as the content of the detected abnormality and data of communication from another wired relay apparatus 20 or the wireless relay apparatus 10 determined as having the abnormality. Furthermore, the information regarding output of the signal and the like may be stored in the storage unit 202 in association with the time or time point when the abnormality occurred.

The control unit 201 determines whether or not a predetermined time has elapsed or a predetermined operation has been carried out (step S04). The predetermined time is a time stored in the storage unit 202 in advance, and is five minutes, for example. The predetermined operation is an operation of the ignition switch of the vehicle 1 being switched off and on, for example.

If the predetermined time has not elapsed, or the predetermined operation has not been carried out (step S04: NO), the control unit 201 performs loop processing, so as to perform the process in step S04 again. Specifically, the control unit 201 that has output the signal for disconnecting communication waits until the predetermined time has elapsed, or the predetermined operation is carried out.

If the predetermined time has elapsed, or the predetermined operation has been carried out (step S04: YES), the control unit 201 that has output the signal for disconnecting communication outputs a signal for resuming communication (step S05). If the abnormality is temporary, even the wireless relay apparatus 10 or wired relay apparatus 20 determined as being abnormal may be restored after the predetermined time has elapsed, or the predetermined operation has been carried out. Therefore, even if it is determined that an abnormality has occurred in the wireless relay apparatus 10 or the other wired relay apparatus 20 directly connected upstream of the wired relay apparatus 20 to which the control unit 201 belongs, a signal for disconnecting communication has been output, and communication with the wireless relay apparatus 10 or the other wired relay apparatus 20 has been disconnected, it is possible to confirm restoration of the wireless relay apparatus 10 or the other wired relay apparatus 20 by outputting a signal for resuming communication.

The control unit 201 performs loop processing to perform the process in step S01 again. Therefore, if the wireless relay apparatus 10 or the other wired relay apparatus 20 that received the signal for resuming communication has not been restored, and it is again determined that there is an abnormality, it is possible to disconnect communication of the wireless relay apparatus 10 or the other wired relay apparatus 20 again.

Note that, in this embodiment, when the predetermined time has elapsed, or the predetermined operation has been carried out, the control unit 201 that has output the signal for disconnecting communication outputs the signal for resuming communication, but there is no limitation thereto. The control unit 201 that has output the signal for disconnecting communication does not need to output a signal for resuming communication any longer. Alternatively, the control unit 201 that has output the signal for disconnecting communication may also perform processing for storing the number of times the signal for resuming communication was output, and not outputting the signal for resuming communication any longer when the number of times exceeds a predetermined value. It is possible to secure the robustness of the relay apparatus system S by maintaining a state for disconnecting communication of the wireless relay apparatus 10 or wired relay apparatus 20 that is unlikely to be restored.

Regarding the wired relay apparatus 20 or the wireless relay apparatus 10 in which the power switch 206 or 107 has been switched off is not operating properly due to a virus or the like, there is a concern that a virus or the like will spread to another wired relay apparatus 20 or ECU 30. In contrast, as a result of switching off the power supply of the wired relay apparatus 20 or the wireless relay apparatus 10 in which an abnormality has occurred, it is possible to disconnect communication with another wired relay apparatus 20 or ECU 30, and prevent a virus or the like from spreading to another wired relay apparatus 20 or ECU 30.

Communication from outside of the vehicle is performed via the wireless relay apparatus 10, and thus there are cases where the wireless relay apparatus 10 is attacked, the security function is disabled, and an abnormal state is entered. Even when the wired relay apparatus 20 directly connected downstream of the wireless relay apparatus 10 is then attacked next, disabling the security function and entering an abnormal state similarly, the wired relay apparatus 20 directly connected downstream of the wired relay apparatus 20 determined as being abnormal detects this abnormality, and switches off the power supply of the wired relay apparatus 20 determined as having the abnormality. As a result of switching off the power supply of the wired relay apparatus 20 determined as having the abnormality, communication is disconnected, and it is possible to protect another wired relay apparatus 20 and ECUs 30 connected downstream of the wired relay apparatus 20 determined as having the abnormality.

The wireless relay apparatus 10 and the wired relay apparatuses 20 are connected in series, and communicate with each other using the bucket-brigade method, each of the wired relay apparatuses 20 turns off the power supply of the wireless relay apparatus 10 or the wired relay apparatus 20 directly connected upstream of the wired relay apparatus 20 to disconnect communication, and, as a result, each of the wired relay apparatuses 20 can function as a barrier. As a result of each wired relay apparatus 20 functioning as a barrier, it is possible to effectively protect the ECU 30 that is connected to the wired relay apparatus 20 positioned on the downstream side and has a high priority in terms of the travelling safety.

Modified Example

Figure 5:
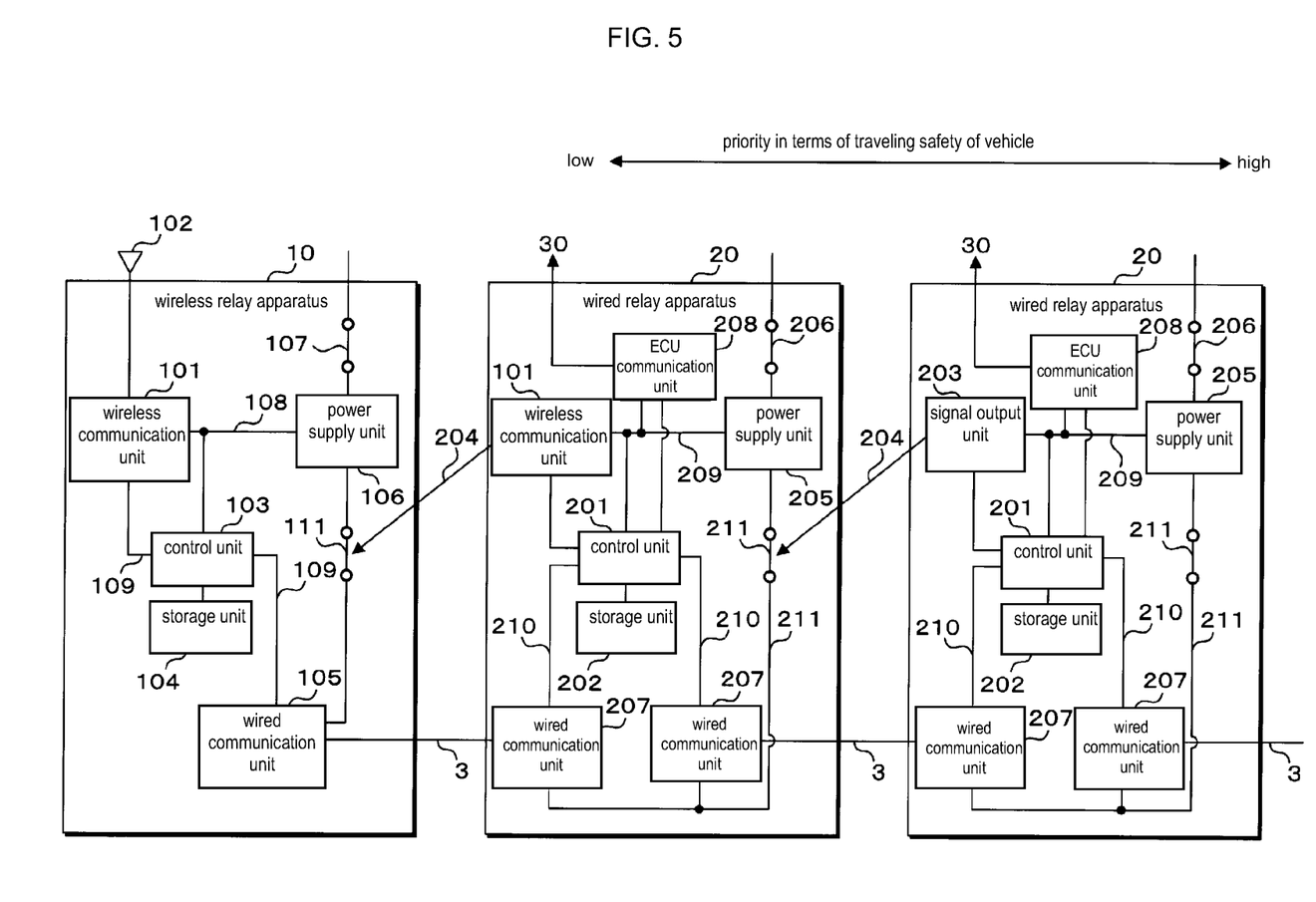
FIG. 5 is a block diagram showing configurations of a wireless relay apparatus and wired relay apparatuses according to a modified example.

FIG. 5 is a block diagram showing configurations of the wireless relay apparatus 10 and wired relay apparatuses 20 according to a modified example. The modified example is different from the first embodiment in that the wireless relay apparatus 10 and each of the wired relay apparatuses 20 according to the modified example further include second power switches 111 and 211 respectively, the switch 211 being disposed between the power supply unit 205 and a wired communication unit 207.

Similarly to the first embodiment, the wireless relay apparatus 10 and the wired relay apparatuses 20 are connected in series, the wireless relay apparatus 10 being on the most upstream side. The wireless relay apparatus 10 and each of the wired relay apparatuses 20 further include the second power switches 111 and 211 respectively, the switch 211 being disposed between the power supply unit 205 and a wired communication unit 207.

The signal output unit 203 of each of the wired relay apparatuses 20 is connected to the second power switch 111 or 211 of the wireless relay apparatus 10 or the wired relay apparatus 20 directly connected on the upstream side, using the signal line 204. Similarly to the signal output unit 203 according to the first embodiment, when an abnormality occurs in the wireless relay apparatus 10 or the wired relay apparatus 20 directly connected on the upstream side, the signal output unit 203 according to the modified example outputs a signal to the second power switch 111 or 211 of the wireless relay apparatus 10 or the wired relay apparatus 20 directly connected on the upstream side, to turn off the second power switch 111 or 211.

As a result of the second power switch 111 or 211 being switched off, power supply to the wired communication units 207 stops, and the wired communication units 207 stops functioning. In each of the wired relay apparatuses 20, the wired communication unit 207 for which the second power switch 211 is provided is the downstream wired communication unit 207.

As described above, as a result of switching off the second power switch 111 or 211, the second power switch 211 being provided between the power supply unit 205 and the wired communication unit 207, it is possible to continue power supply to the control unit 103 or 201 of the wireless relay apparatus 10 or the wired relay apparatus 20 while disconnecting communication between the wired relay apparatus 20 and the wireless relay apparatus 10 or the wired relay apparatus 20 directly connected upstream of the wired relay apparatus 20. Therefore, there are cases where the control unit 103 or 201 of the wireless relay apparatus 10 or the wired relay apparatus 20 executes a self-diagnosis program and the like, and recovers from an abnormal state to a normal state. After recovering to the normal state, the control unit 103 or 201 switches on the second power switch 111 or 211, the second power switch 211 being provided between the power supply unit 205 and the wired communication unit 207 of the apparatus to which the switch belongs. As a result of the second power switch 111 or 211 being switched on, it is possible to resume communication with the wireless relay apparatus 10 or another wired relay apparatus 20.

Note that, as shown in FIG. 5, the wireless relay apparatus 10 according to the modified example includes the power switch 107 and the second power switch 111 provided between the power supply unit 106 and the wired communication unit 105, and each of the wired relay apparatuses 20 according to the modified example includes the power switch 206 provided between the power supply unit 205 and the power storage apparatus 5, and the second power switch 211 provided between the power supply unit 205 and the wired communication unit 207, but there is no limitation thereto. A configuration may also be adopted in which the wireless relay apparatus 10 according to the modified example includes only the second power switches 111 provided between the power supply unit 106 and the wired communication unit 105, and each of the wired relay apparatuses 20 according to modified example includes only the second power switch 211 provided between the power supply unit 205 and the wired communication unit 207.

The disclosed embodiments here are to be considered as illustrative and non-limiting in all aspects. The scope of the present disclosure is indicated not by the above-stated meanings but by the claims, and is intended to include all modifications that are within the meanings and the scope that are equivalent to those of the claims.

The invention claimed is:

1. A relay apparatus system that is mounted in a vehicle, comprising:
  a wireless relay apparatus that wirelessly communicates with a communication apparatus provided outside of the vehicle, the wireless relay apparatus including a wired communication unit; and
  a plurality of wired relay apparatuses that are connected in series downstream of the wireless relay apparatus in response to the communication apparatus being positioned upstream of the wireless relay apparatus,
  wherein each of the plurality of wired relay apparatuses includes a downstream communication unit and an upstream communication unit that are communicably connected to an Electronic Control Unit (ECU) for controlling an in-vehicle apparatus that is mounted in the vehicle, the downstream wired communication unit and the upstream communication unit having the same protocol as the wired communication unit, wherein the downstream wired communication unit of one wired relay device of the plurality of wired relay apparatuses is connected to the upstream wired communication unit of the other wired relay device of the plurality of wired relay apparatuses.

2. The relay apparatus system according to claim 1, wherein a priority of an ECU that is connected to a first wired relay apparatus out of the plurality of wired relay apparatuses is lower, in terms of travelling safety of the vehicle, than a priority of an ECU that is connected to a second wired relay apparatus that is directly connected downstream of the first wired relay apparatus.

3. The relay apparatus system according to claim 2, wherein a priority in terms of travelling safety of the ECU is determined based on ASIL (Automotive Safety Integrity Level) of ISO26262.

4. The relay apparatus system according to claim 1, wherein the ECUs include a travelling control ECU for travelling control of the vehicle, and a wired relay apparatus that is connected to the travelling control ECU is connected on a downstream side.

5. The relay apparatus system according to claim 1, wherein each of the wireless relay apparatus and the plurality of wired relay apparatuses includes a communication disconnection unit that disconnects communication thereof, and
  each of the plurality of wired relay apparatuses includes:
    a determination unit that performs abnormality determination of the wireless relay apparatus or another wired relay apparatus that is connected upstream of the wired relay apparatus to which the determination unit belongs, and
    a signal output unit that, in response to the determination unit determining that the other wired relay apparatus or the wireless relay apparatus is abnormal, outputs a signal for disconnecting communication to the communication disconnection unit of the other wired relay apparatus or the wireless relay apparatus determined as being abnormal.

6. The relay apparatus system according to claim 5, wherein the communication disconnection unit includes a switch for switching on or off a power supply related to communication of the apparatus to which the communication disconnection unit belongs, and
  the signal output unit outputs an off signal for switching off the power supply to the switch so as to disconnect communication.

7. The relay apparatus system according to claim 6, wherein after a predetermined period has elapsed from when the off signal was output, or after a predetermined operation has been carried out, the signal output unit outputs an on signal for switching on the power supply to the switch that output the off signal, so as to resume communication.

8. The relay apparatus system according to claim 2, wherein the ECUs include a travelling control ECU for travelling control of the vehicle, and a wired relay apparatus that is connected to the travelling control ECU is connected on the downstream side.

9. The relay apparatus system according to claim 3, wherein the ECUs include a travelling control ECU for travelling control of the vehicle, and a wired relay apparatus that is connected to the travelling control ECU is connected on the downstream side.

10. The relay apparatus system according to claim 2, wherein each of the wireless relay apparatus and the plurality of wired relay apparatuses includes a communication disconnection unit that disconnects communication thereof, and
  each of the plurality of wired relay apparatuses includes:
    a determination unit that performs abnormality determination of the wireless relay apparatus or another wired relay apparatus that is connected upstream of the wired relay apparatus to which the determination unit belongs, and
    a signal output unit that, if the determination unit determines that the other wired relay apparatus or the wireless relay apparatus is abnormal, outputs a signal for disconnecting communication to the communication disconnection unit of the other wired relay apparatus or the wireless relay apparatus determined as being abnormal.

11. The relay apparatus system according to claim 3, wherein each of the wireless relay apparatus and the plurality of wired relay apparatuses includes a communication disconnection unit that disconnects communication thereof, and
  each of the plurality of wired relay apparatuses includes:
    a determination unit that performs abnormality determination of the wireless relay apparatus or another wired relay apparatus that is connected upstream of the wired relay apparatus to which the determination unit belongs, and a signal output unit that, if the determination unit determines that the other wired relay apparatus or the wireless relay apparatus is abnormal, outputs a signal for disconnecting communication to the communication disconnection unit of the other wired relay apparatus or the wireless relay apparatus determined as being abnormal.

12. The relay apparatus system according to claim 4, wherein each of the wireless relay apparatus and the plurality of wired relay apparatuses includes a communication disconnection unit that disconnects communication thereof, and each of the plurality of wired relay apparatuses includes:
a determination unit that performs abnormality determination of the wireless relay apparatus or another wired relay apparatus that is connected upstream of the wired relay apparatus to which the determination unit belongs, and a signal output unit that, if the determination unit determines that the other wired relay apparatus or the wireless relay apparatus is abnormal, outputs a signal for disconnecting communication to the communication disconnection unit of the other wired relay apparatus or the wireless relay apparatus determined as being abnormal.

13. A relay apparatus that is one relay apparatus out of a plurality of relay apparatuses that are disposed in a vehicle, are communicably connected to each other in series, and includes a wireless relay apparatus that wirelessly communicates with a communication apparatus provided outside of the vehicle, wherein the one relay apparatus receives a signal related to disconnection of communication of the one relay apparatus, or outputs a signal related to disconnection of communication of another relay apparatus directly connected to the one relay apparatus;

wherein, when the communication apparatus is assumed to be on an upstream side, the wireless relay apparatus is connected on the most upstream side relative to the other relay apparatuses, and each of the relay apparatuses includes a communication disconnection unit that receives a signal related to disconnection of communication output from another relay apparatus directly connected to the relay apparatus to which the communication disconnection unit belongs, and disconnects communication of the relay apparatus to which the communication disconnection unit belongs.

14. The relay apparatus according to claim 13, comprising:

a communication unit that is communicably connected to an ECU for controlling an in-vehicle apparatus that is mounted in the vehicle;

a communication disconnection unit that receives a signal related to disconnection of communication output from a relay apparatus directly connected downstream of the relay apparatus to which the communication disconnection unit belongs, when a relay apparatus that wirelessly communicates with a communication apparatus provided outside of the vehicle is assumed to be positioned on an upstream side, and disconnects communication of the relay apparatus to which the communication disconnection unit belongs;

a determination unit that performs abnormality determination on a relay apparatus directly connected upstream of the relay apparatus to which the determination unit belongs; and a signal output unit that outputs a signal related to disconnection of communication to the upstream relay apparatus when the determination unit determines that the upstream relay apparatus is abnormal.

15. The relay apparatus according to claim 13, comprising:

a communication unit that is communicably connected to an ECU for controlling an in-vehicle apparatus that is mounted in the vehicle, the communication unit being connected on the most downstream side when a relay apparatus that wirelessly communicates with a communication apparatus provided outside of the vehicle is assumed to be on an upstream side;

a determination unit that performs abnormality determination of a relay apparatus that is directly connected upstream of the relay apparatus to which the determination unit belongs; and a signal output unit that outputs a signal related to disconnection of communication to the upstream relay apparatus when the determination unit determines that the upstream relay apparatus is abnormal.

* * * * *